March 8, 1966   G. W. LEAVESLEY, JR., ETAL   3,239,079
WORK FEEDER FOR MACHINE TOOL
Filed June 23, 1964                                   5 Sheets-Sheet 1

INVENTORS
GEORGE W. LEAVESLEY, JR.
BY  LEO ZELIGOWSKY

*Douglas R. McKechnie*
ATTORNEY

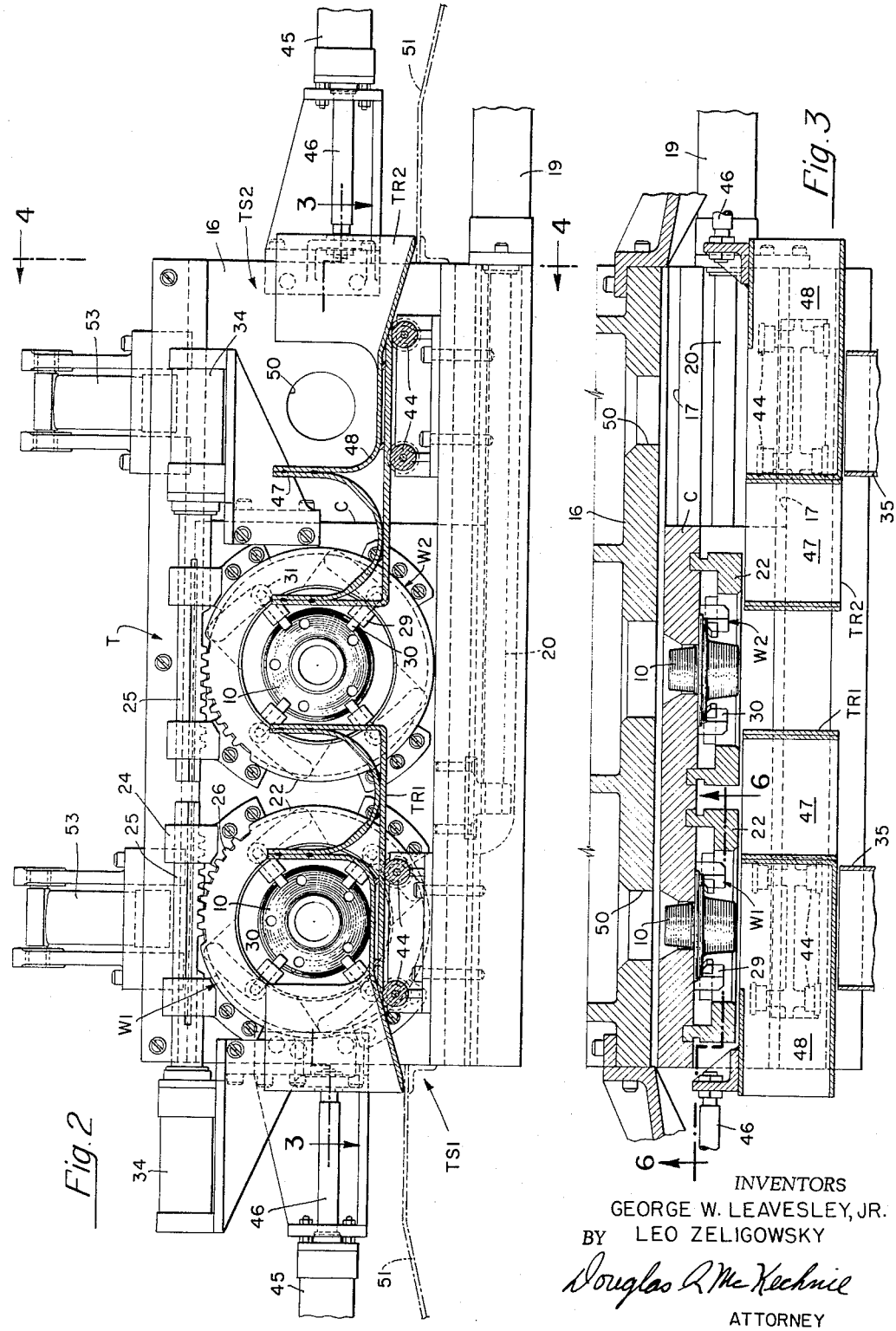

INVENTORS
GEORGE W. LEAVESLEY, JR.
LEO ZELIGOWSKY
BY
Douglas R. McKechnie
ATTORNEY March 8, 1966   G. W. LEAVESLEY, JR., ETAL   3,239,079
WORK FEEDER FOR MACHINE TOOL
Filed June 23, 1964   5 Sheets-Sheet 4
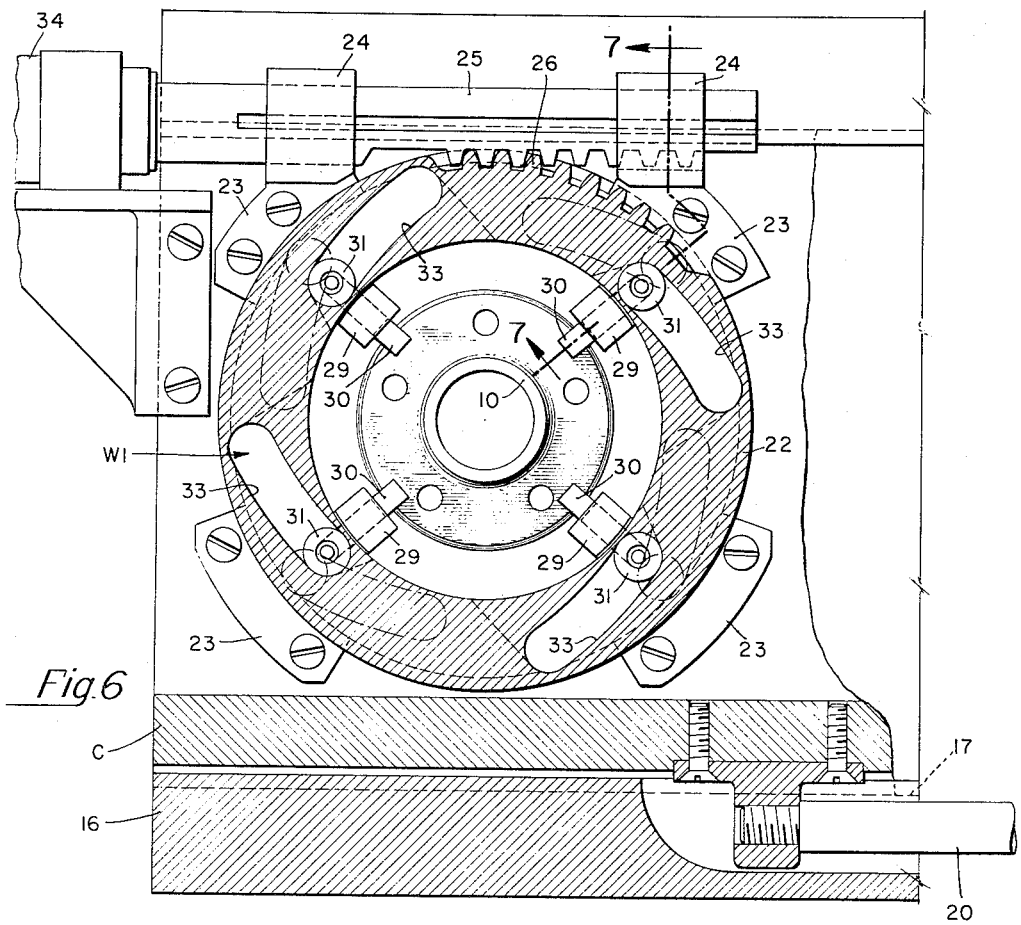
Fig. 6
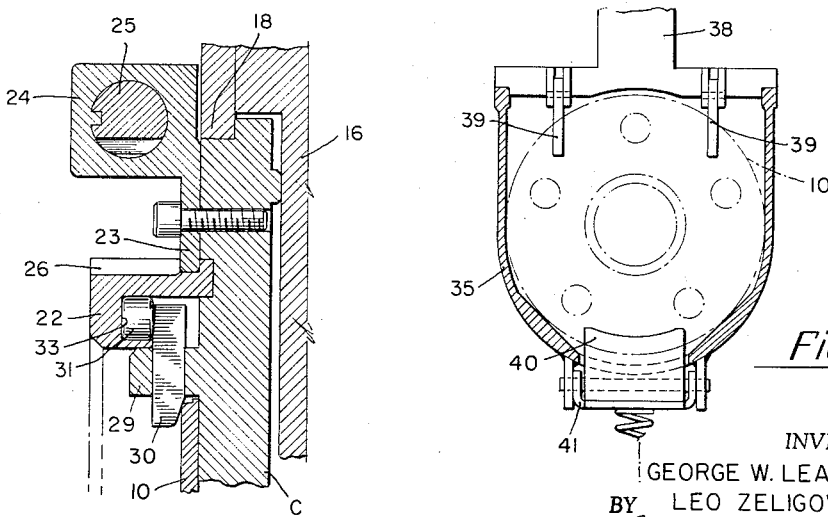
Fig. 7
Fig. 8
INVENTORS
GEORGE W. LEAVESLEY, JR.
BY   LEO ZELIGOWSKY
Douglas R. McKechnie
ATTORNEY March 8, 1966  G. W. LEAVESLEY, JR., ETAL  3,239,079
WORK FEEDER FOR MACHINE TOOL
Filed June 23, 1964                    5 Sheets-Sheet 5
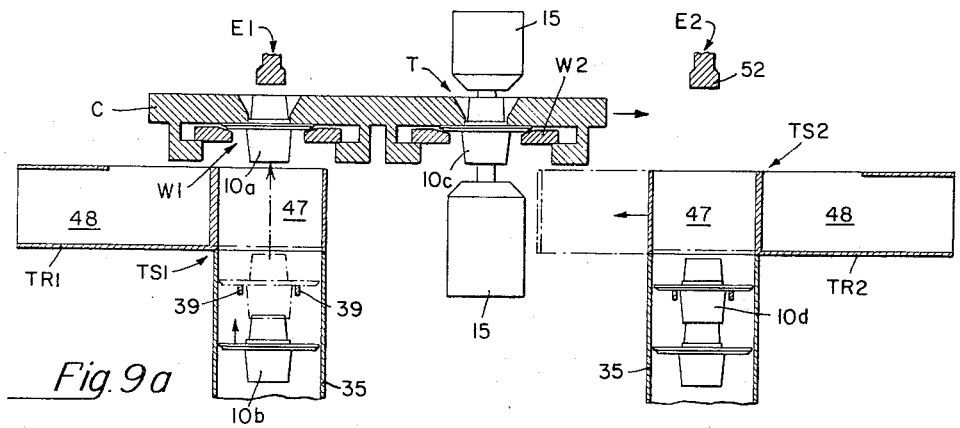
Fig. 9a
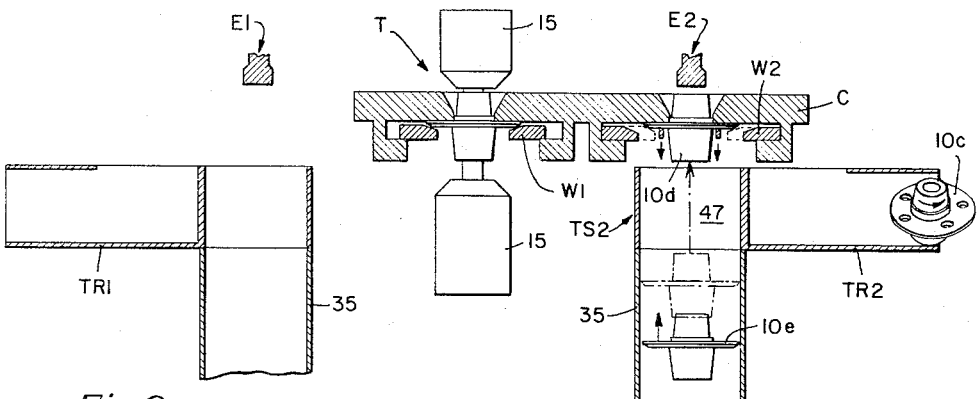
Fig. 9b
Fig. 9c
INVENTORS
GEORGE W. LEAVESLEY, JR.
BY   LEO ZELIGOWSKY
Douglas R. McKechnie
ATTORNEY

3,239,079
WORK FEEDER FOR MACHINE TOOL
George W. Leavesley, Jr., Ridgewood, N.J., and Leo Zeligowsky, Narberth, Pa., assignors to The Budd Company, Philadelphia, Pa., a corporation of Pennsylvania
Filed June 23, 1964, Ser. No. 377,352
7 Claims. (Cl. 214—1)

This invention relates to a machine tool and, more particularly, to a workpiece handling mechanism for feeding workpieces to and from a tool station.

One of the objects of the invention is to provide a machine tool having a novel workpiece handling mechanism that is suitable for high speed automatic operation.

Another object is to provide a machine tool wherein workpieces are fed alternately from two workpiece flow lines to a single tool station.

Still another object is to provide a machine tool having two work holders so that while one is at a tool station, the other is at a transfer station. Thus, one workpiece can be machined while others are unloaded and loaded.

A further object is to provide a novel transfer mechanism where the loading and unloading of a workpiece is done at a station spaced from where the workpiece is machined.

Another object is to provide a machine tool having a novel work holder that automatically aligns pre-oriented workpieces fed to the work holder.

Still another object is to provide a machine tool for machining automotive hubs.

Other objects and advantages of the invention will be apparent from the following description taken in connection with the accompanying drawings wherein:

FIG. 2 is a front elevational view, partly in section, looking along reference lines 2—2 of FIG. 1;

FIG. 3 is a horizontal sectional view looking along reference lines 3—3 of FIG. 2;

FIG. 6 is a vertical sectional view along lines 6—6 of FIGS. 3 and 5;

FIG. 7 is an enlarged, detail sectional view along lines 7—7 of FIG. 6;

FIG. 8 is a rear elevational view, partly in section, along lines 8—8 of FIG. 5; and FIGS. 9a–9c are schematic views illustrating details of the operation of the machine tool of FIGS. 1–8.

Figure 1:
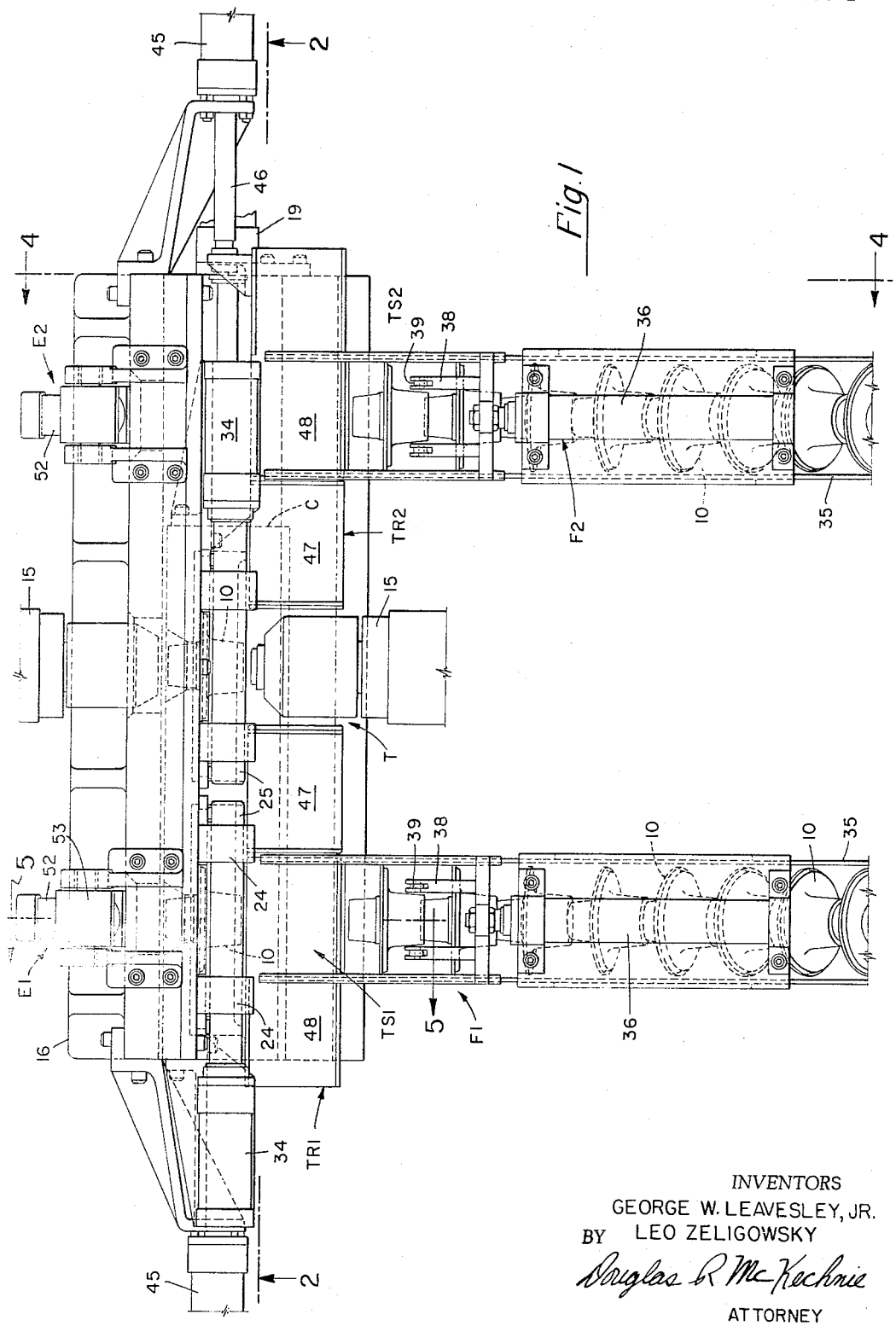
FIG. 1 is a top plan view, with portions removed, of a machine tool embodying the invention.
Figure 4:
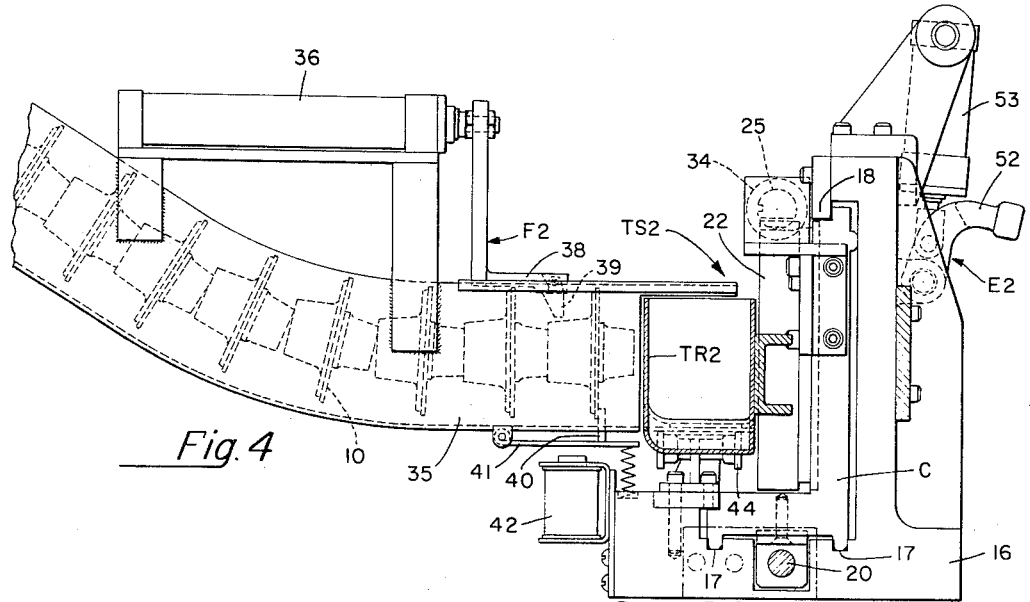
FIG. 4 is a side elevational view, partly in section looking along reference lines 4—4 of FIGS. 1 and 2.
Figure 5:
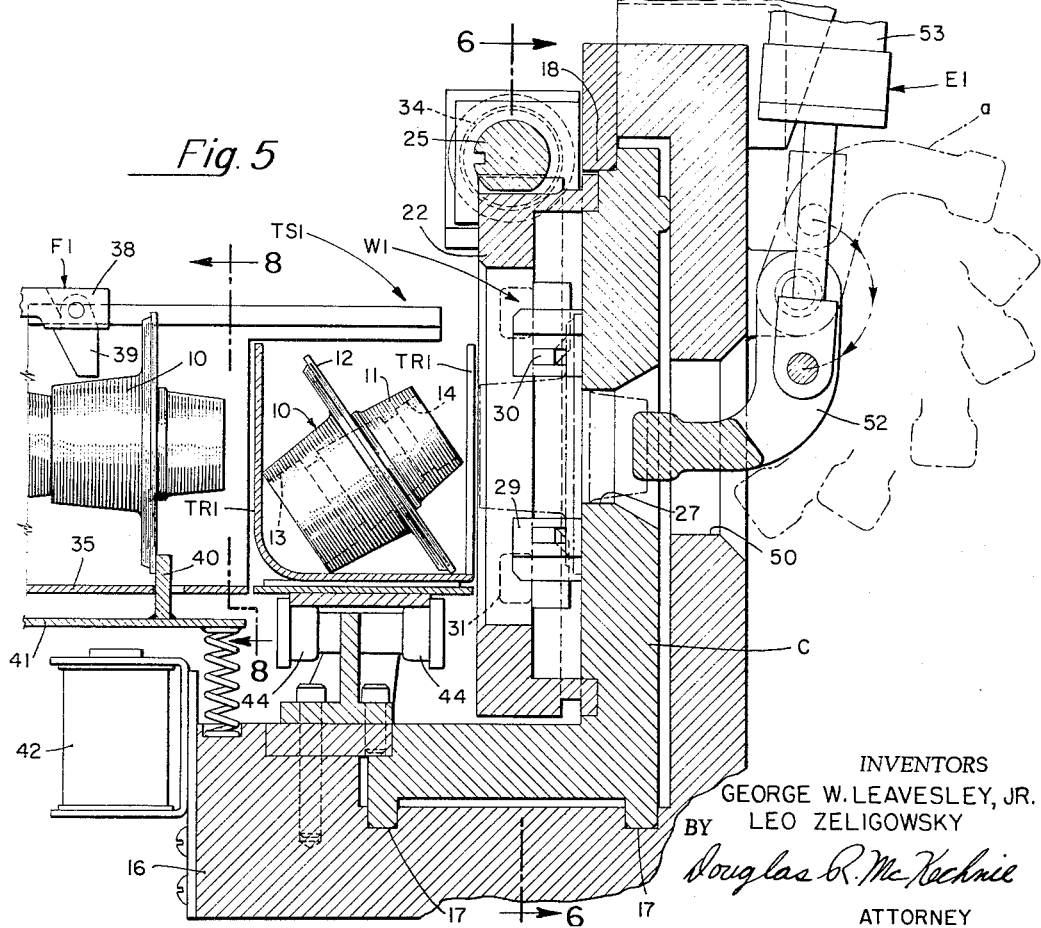
FIG. 5 is a vertical sectional view along lines 5—5 of FIG. 1.

Referring now to the drawings, the invention is illustrated as embodied in a machine tool for machining automotive hubs 10. As shown in FIG. 5, each hub 10 has an axially-extending portion 11, a radial flange 12 and an axial bore that is counterbored at 13 and 14 by the machine tool to define the usual seats for conventional bearing races.

Except for the novel workpiece handling mechanism the machine tool is old and only those old portions shown at tool station T as are necessary to understand the invention are illustrated. Generally, the machine tool comprises tool station T located centrally between two laterally spaced transfer stations TS1 and TS2 from which hubs are fed alternately, to the tool station T, by means of work holders W1 and W2 carried by a reciprocating carriage C.

The machine tool is classed as a multiple spindle, horizontal boring machine and comprises two, opposed, aligned spindles 15 having rotary cutting tools that are timely fed into and out of the hub, by conventional means, to machine counterbores 13 and 14. The tool also comprises a base 16 adapted to be mounted on the bed or frame of the machine tool. Base 16 has horizontal transverse ways 17 slidably supporting carriage C and a vertical overhang 18 that slidably engages the upper edge of the carriage. The carriage is moved by an air cylinder or pneumatic actuator 19 having a piston rod 20 that extends freely along a groove in base 16 and is connected to the underside of carriage C. Actuator 19 moves carriage C a lateral displacement equal to the distance between workholders W1 and W2 whereby the workholders are alternately aligned with the tool station and the transfer stations.

The workholders are of similar construction. With reference to workholder W1, as best seen in FIGS. 5–7, each workholder W comprises a circular ring 22 rotatably mounted on carriage C, by four mounts 23 two of which are integral with bearing blocks 24 that slidably support a rack 25 engaged with teeth 26 on the periphery of ring 22. Ring 22 is concentric to a hole 27 in the vertical backplate of the carriage. Four lugs 29 are integral with the carriage backplate and are evenly spaced around hole 27 in radially spaced relationship thereto. Each lug slidably supports a reciprocating finger 30 that is attached at its radially outer end to a roller cam follower 31 received in a cam groove 33 in ring 22. Rack 25 is on the end of a piston rod of a selectively actuated pneumatic actuator 34 mounted on the carriage backplate.

Upon actuation, actuator 34 moves rack 25 and thereby rotates ring 22 causing the cam means to move fingers 30 radially inwardly whereby the inner beveled ends of the finger wedge against the periphery of flange 12 of a hub and thereby clamp such flange against the carriage backplate. Upon deactuation of the actuator, ring 22 is rotated in the opposite direction and fingers 30 are moved radially outwardly to release the hub. Hole 27 is sized so that as a hub is fed into the workholder, the axial portion 11 of the hub enters hole 27 and, because of the taper of the hub, hole 27 automatically aligns the hub in the center of the workholder.

The hubs are fed to the workholders W1 and W2, at transfer stations TS1 and TS2 from delivery chutes 35 where the hubs are intermittently fed, in oriented positions, by feeders F1 and F2 across trays TR1 and TR2. Each feeder F comprises an air cylinder 36 that reciprocates a member 38 carrying two, laterally spaced, overriding fingers 39. Each feeder also comprises a stop member 40 carried by a spring biased armature 41 adapted to be actuated by an electromagnet 42.

Each feeder is operated as follows: When it is time to feed a hub to the workholder, solenoid 42 is energized to release the hub and actuator 36 is actuated causing fingers 39 to bear against flange 12 and push the hub out of delivery chute 35, across the adjacent tray and into the workholder. After the hub clears stop member 40, the solenoid 42 is deenergized allowing the stop member to be moved to its operative position to stop the next hub. The feeding is aided by the succeeding hubs pushing against each other. When the actuator is deactuated, fingers 39 are returned to their former positions and in the course of such return movement, the fingers cam over or override flange 12 of the next hub.

Each tray TR is slidably mounted on base 16 via rollers 44 for transverse movement in response to the selective actuation and deactuation of a pneumatic actuator 45 having a piston rod 46 connected to the tray. Each tray has a delivery compartment 47 and a discharge compartment 48 each provided with an entrance and an exit through which hubs can pass. When the tray is in the delivery position, the delivery compartment entrance is aligned with the exit from the delivery chute 35 so that a hub can be fed across the tray, from the chute, to the associated workholder W. When the tray is in the discharge position, the discharge compartment entrance is located so that a hub ejected from the associated workholder falls into the tray, in an oriented fashion as shown in FIG. 5. The trays are moved rapidly from their discharge positions to their delivery positions so that a hub in a discharge compartment is accelerated and, when the tray stops, rolls laterally off the tray onto a discharge chute or apron 51 located laterally of the respective transfer stations at approximately the same height as the discharge end of the delivery chute.

Base 16 includes a backplate, behind carriage C, provided with two laterally spaced holes 50 located opposite transfer stations TS1 and TS2. Two ejectors E1 and E2 are located adjacent holes 50 at the transfer stations TS. Each ejector E comprises a hammer 52 pivotally mounted on the base backplate and operative, upon actuation of an air cylinder actuator 53, to knock the hub from the workholder aligned therewith into the associated tray. Normally, the hammer is held in the position indicated by lines $a$ in FIG. 5. Upon actuation of the ejector, the head of the hammer swings downwardly in an arc and strikes the back of the hub, the downward movement continuing until the hammer reaches the position indicated by the full lines in FIG. 5. Upon deactuation, the hammer is returned to its normal position.

The operation of the machine tool is controlled by conventional controls (not shown) and is best understood with reference to FIGS. 9a–9c. Beginning with the operations illustrated in FIG. 9a, as hub 10c, held by workholder W2, is machined at tool station T, a hub 10a is fed by feeder F1 into open workholder W1 whereupon the workholder is closed to clamp the hub in place. As hub 10a is thus delivered through compartment 47 of tray TR1, hub 10b is moved into position for being fed.

After hub 10c is machined, and hub 10a is in place, carriage C is shifted laterally bringing workholder W1 and hub 10a to the tool station and bringing workholder W2 and hub 10c to transfer station TR2, as shown in FIG. 9b. When the carriage is shifted, tray TR2 is shifted to its discharge position wherein compartment 48 thereof is aligned to receive the ejected hub. Next, workholder W2 is opened to release hub 10c and ejector E2 is actuated to knock or eject hub 10c into tray TR2. Once hub 10a is at tool station T, the machining is begun so that the step of ejecting the finished workpiece is carried out during the course of the machining.

After hub 10c is ejected into tray TR2, the tray is shifted to its delivery position causing hub 10c to roll off the tray onto apron 51. Then, a hub 10d is fed to workholder W2, as hub 10e moves into feeding position, whereupon the above-described sequence of operations is repeated.

Thus, a high speed automatic machine tool is provided that is particularly suitable for use in an automated production line. While only a single embodiment has been illustrated, it will be apparent to those skilled in the art that many changes can be made in the details and arrangement of parts without departing from the scope of the invention as defined in the appended claims.

What is claimed is:
1. In a machine tool having a tool station at which work pieces are machined, the combination of: a transfer station spaced laterally from said tool station; a workholder; means mounting said workholder for reciprocating movement between said tool station and said transfer station; first means operable for delivering a workpiece to said workholder at said transfer station; second means operable for ejecting a workpiece from said workholder at said transfer station and a reciprocating tray common to said first and second means.

2. In a machine tool having a tool station at which workpieces are machined, the combination of: a transfer station spaced laterally from said tool station; a delivery line leading into said transfer station; a discharge line leading out of said transfer station; a workholder; a reciprocating carriage supporting said workholder for movement between first and second positions aligned with said transfer station and said tool station; first means for transferring a workpiece from said delivery line to said workholder; second means for transferring a workpiece from said workholder to said discharge line, said second means comprising an ejector adapted to knock out a workpiece from said workholder, a movable tray having a compartment for receiving a workpiece from said workholder, and means for moving said tray so as to accelerate a workpiece thereon for discharge into said delivery line.

3. The combination of claim 2 comprising a tray common to said first and second means, said tray being movable and provided with a delivery compartment for guiding moving of a workpiece from said delivery line to said workholder and a discharge compartment for transferring an ejected workpiece to said discharge line.

4. The combination of claim 3 including means for moving said tray to accelerate a workpiece in said discharge compartment whereby the inertia of said workpiece causes it to move from said tray to said delivery line.

5. In a machine tool having a tool station where workpieces are machined, the combination of: two transfer stations equally spaced on opposite sides of said tool station; a reciprocating carriage movable between two alternate positions at said stations; two workholders mounted on said carriage and spaced apart in the direction of movement of the carriage a distance equal to the amount of such movement, whereby each workholder is alternately positionable at said tool station and one of said transfer stations; and means for feeding workpieces to and from said workholders at each of said transfer stations.

6. The combination of claim 5 including, at each transfer station, a delivery chute for feeding workpieces into said transfer station, and a discharge chute for receiving workpieces from said transfer station.

7. The combination of claim 6 wherein said chutes are spaced from the associated workholders, and the combination further includes trays for transferring workpieces between said chutes and said workholders.

References Cited by the Examiner
UNITED STATES PATENTS

| | | | |
|---|---|---|---|
| 1,993,754 | 3/1935 | Smith | 214—1 |
| 2,719,623 | 10/1955 | Bower | 198—19 |
| 2,761,507 | 9/1956 | Clarke | 198—19 XR |
| 3,813,380 | 11/1957 | Narel | 51—105 |

MARVIN A. CHAMPION, *Primary Examiner.*